(12) United States Patent
Wanner et al.

(10) Patent No.: US 11,009,945 B2
(45) Date of Patent: May 18, 2021

(54) METHOD FOR OPERATING AN EYE TRACKING DEVICE FOR MULTI-USER EYE TRACKING AND EYE TRACKING DEVICE

(71) Applicant: Apple Inc., Cupertino, CA (US)

(72) Inventors: Fabian Wanner, Berlin (DE); Matthias Nieser, Berlin (DE); Kun Liu, Berlin (DE); Walter Nistico, Berlin (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/526,386

(22) Filed: Jul. 30, 2019

(65) Prior Publication Data

US 2019/0377410 A1 Dec. 12, 2019

Related U.S. Application Data

(63) Continuation of application No. 15/557,599, filed as application No. PCT/EP2016/055187 on Mar. 10, 2016, now Pat. No. 10,416,764.

(30) Foreign Application Priority Data

Mar. 13, 2015 (EP) .................................... 15159082

(51) Int. Cl.
*G06F 3/01* (2006.01)
*G06F 1/16* (2006.01)
(Continued)

(52) U.S. Cl.
CPC ............ *G06F 3/013* (2013.01); *G06F 1/1686* (2013.01); *G06F 3/0425* (2013.01); *G06K 9/00597* (2013.01); *G06K 9/00604* (2013.01)

(58) Field of Classification Search
CPC ............ G06K 9/00597; G06K 9/00604; G06F 1/1686; G06F 3/0425; G06F 3/013
(Continued)

(56) References Cited

U.S. PATENT DOCUMENTS

2008/0243844 A1 10/2008 Ichikawa
2008/0281797 A1 11/2008 Hori
(Continued)

FOREIGN PATENT DOCUMENTS

EP 2450872 A1 9/2012
EP 2450872 B1 * 12/2013 ........... G06F 1/1686

OTHER PUBLICATIONS

International Search Report and Written Opinion for PCT/EP2016/055187 dated May 30, 2016.
(Continued)

*Primary Examiner* — Loi H Tran
(74) *Attorney, Agent, or Firm* — Fernando & Partners, LLP

(57) ABSTRACT

The invention relates to a method for operating an eye tracking device (10) for multi-user eye tracking, wherein images (24) of a predefined capturing area (14) of the eye tracking device (10) are captured by means of an imaging device (12) of the eye tracking device (10) and the captured images (24) are processed by means of a processing unit (16) of the eye tracking device (10). If a first user (26a) and a second user (26b) are present in the predefined capturing area (14) of the eye tracking device (10), a first information relating to the first user (26a) and a second information relating to the second user (26b) are determined on the basis of the captured images (24) by processing the images (24). Furthermore the images (24) are captured successively in a predeterminable time sequence.

19 Claims, 5 Drawing Sheets

Figure 1:
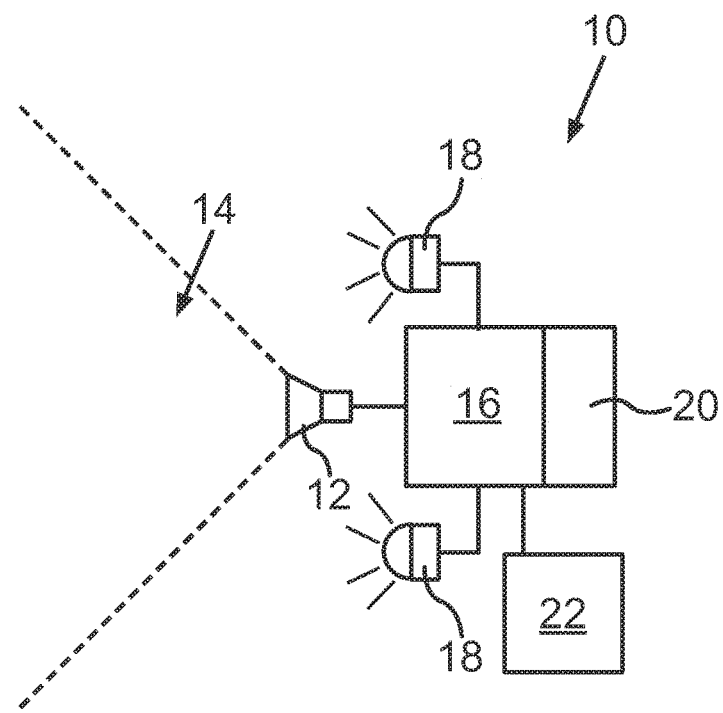

(51) Int. Cl.
*G06F 3/042* (2006.01)
*G06K 9/00* (2006.01)

(58) Field of Classification Search
USPC .......................................... 348/78
See application file for complete search history.

(56) References Cited

U.S. PATENT DOCUMENTS

| | | |
|---|---|---|
| 2009/0158323 A1 | 6/2009 | Bober et al. |
| 2009/0284799 A1 | 11/2009 | Matsuhira |
| 2009/0309961 A1 | 12/2009 | Miyashita |
| 2014/0050370 A1 | 2/2014 | Inkumsah et al. |
| 2015/0220768 A1* | 8/2015 | Ronnecke ............ G06K 9/0061 348/78 |
| 2016/0219208 A1* | 7/2016 | Horesh .................. G03B 17/38 |

OTHER PUBLICATIONS

International Preliminary Report on Patentability for PCT/EP2016/055187 completed Feb. 14, 2017.

* cited by examiner ature eye tracking device and eye tracking device

CROSS-REFERENCE TO RELATED APPLICATIONS

This application is a continuation of U.S. patent application Ser. No. 15/557,599, filed on Sep. 12, 2017, which is the national phase entry of Intl. App. No. PCT/EP2016/055 187, filed on Mar. 10, 2016, which claims priority to European Patent App. No. 15159082.5, filed on Mar. 13, 2015, each of which are hereby incorporated by reference in their entirety.

The invention relates to a method for operating an eye tracking device for multi-user eye tracking, wherein images of a predefined capturing area of the eye tracking device are captured by means of an imaging device of the eye tracking device and the captured images are processed by means of a processing unit of the eye tracking device. If a first user and a second user are present in the predefined capturing area of the eye tracking device, a first information relating to the first user and a second information relating to the second user are determined on the basis of the captured images by processing the images. The invention also relates to an eye tracking device for multi-user eye tracking.

Most systems known from the prior art dealing with multi-user eye tracking usually are only able to track one user after the other but not at the same time. Furthermore, T. Villgrattner, H. Ulbrich: "Design and control of compact high dynamic camera orientation systems" Mechatronics IEEE/ASME, Transactions on, on pages: 221 to 231, Volume: 16, Issue: 2, Apr. 2011, ISSN: 1083-4435, doi 10.1109/TMECH. 2009. 2039223 discloses cameras, which can rotate and swivel to follow the eyes of the user, called active camera orientation system. Therein eye tracking on multiple people at the same time is also described. For performing multi-user eye tracking multiple cameras are used, especially one scene camera to obtain an overview of the users present in the scene and two active camera orientation systems, one for tracking each user. This approach has the advantage of getting a detailed image of each user, but even several disadvantages. Each camera actually is responsible for tracking a single individual. Only the scene cameras sees multiple users, but no eye tracking can be performed based on a scene camera image, partially due to the inferior image quality. This also means to be able to track N users it will be necessary to have N active camera orientation systems. Tracking multiple users with a single active camera orientation system seems difficult due to the frame rate of 60 frames per second. To achieve an eye tracking rate of 30 frames per second in the case of two users the system would have to take an image, reorient the camera to the next person, take an image and move back. All of this has to be done without a loss in frame rate due to the reorientation part of the process. So for performing multiuser eye tracking a multi camera system is necessary comprising expansive pan-tilt cameras.

Therefore it is an object of the present invention to provide a method for operating an eye tracking device for multi-user eye tracking and an eye tracking device for multi-user eye tracking by means of which multi-user eye tracking can be performed in a simpler way.

This object is solved by a method for operating an eye tracking device with the features of claim 1 and an eye tracking device with the features of claim 15. Advantageous embodiments of the invention are presented in the dependent claims.

According to the invention a method for operating an eye tracking device for multi-user eye tracking is provided wherein images of a predefined capturing area of the eye tracking device are captured by means of an imaging device of the eye tracking device, the captured images are processed by means of a processing unit of the eye tracking device and, if a first user and a second user are present in the predefined capturing area of the eye tracking device, a first information relating to the first user and a second information relating to the second user are determined on the basis of the captured images by processing these images. Furthermore, the images are captured successively in a predeterminable time sequence.

Capturing the images successively in a predeterminable time sequence, namely the images on the basis of which the information relating to different users are determined, makes it possible to use for example only one camera to track multiple users at the same time. For this purpose for example a camera can be used, which has a wide opening angle to be able to see multiple people, the imaging device also can comprise several cameras or image sensors and each image is a composition of the single image parts captured by each of the cameras or sensors to provide a large capturing area. Moreover, the predefined capturing area can also be variable and/or adjustable in a predefined manner. But the most important advantage of the invention is, that cameras of the eye tracking device are not assigned to respective users. For example one and the same image can be used to derive information, i.e. the first and second information, relating to different users at the same time.

The first and second information preferably relate to the presence of the first and second user respectively and/or the gaze direction and or point of regard of the first and second user respectively. So on the basis of the captured images user detection can be performed, that means that a presence of users can be determined, e.g. on the basis of different criteria, as well as eye tracking can be performed for different users on the basis of the captured images.

Furthermore, according to an advantageous embodiment of the invention the first information and the second information are determined on the basis of the same image of the captured images and/or on the basis of different and successively captured images. So for example each of the captured images can be used to derive the information relating to the first and second user at the same time or the information relating to the first and second user can be derived from different images, which are then captured consecutively. Also, some of the captured images can be used for deriving both, the first and second information, and some of the images can be used for only deriving the first information and some of the images can be used for only deriving the second information. So there are advantageously many possibilities of using the consecutively captured images, which facilitate adaption to the different situations in many different cases.

For example the processing unit can process at least some of the captured images for determining whether the first and/or second user is present in the predefined capturing area. In general, this invention does not only work with the first and the second user but also with an arbitrary number of different users. Also, if the eye tracking device already tracks the gaze of a first user on the basis of the captured images, the eye tracking device still checks at least in some of the captured images whether another user is present.

So it is a very advantageous embodiment of the invention that, if the first user is present in the predefined capturing area, the processing unit tracks the gaze direction and/or point of regard of the first user on the basis of at least some of the captured images and processes at least some of the captured images for determining whether the second user is present in the predefined capturing area. Also here, the images used for tracking the already detected first user and the images used for detecting the presence of another user, like the second user, can be the same or different ones, but if they are different ones, they have been captured consecutively.

So, advantageously, the processing unit can process each of the captured images for determining whether the second user is present in the predefined capturing area or the processing unit can process only some of the captured images, in particular in predefined, especially regular time intervals and/or with a frequency that varies in dependency on at least one predefined parameter, which can be an external or internal parameter, like the average user number in recent history.

So for example, if in the beginning of this method no user is present in the predefined capturing area, the eye tracking device can start capturing images and processing these images for detecting users. Therefore, the processing unit can search in the images, whether faces or eyes or pairs of eyes are present in each of the captured images. If for example the first user is detected in one of these images, the eye tracking device can start an eye tracking process for the first user, meaning that the images captured in the following are used for tracking the eyes of the detected user. Still the processing unit can process some of these images, or even all of them at the same time for detecting further users. E.g. the processing unit can process the captured images such that eye properties of the first user are derived from the captured images and the gaze direction and/or point of regard is calculated on the basis of these eye properties, wherein at the same time every fifth of the captured images is used for checking whether new users are present in the capturing area. This checking can also be performed on every captured image, in predefined time intervals or in an alternating fashion. For searching for new users in an image and for determining eye properties on the basis of an image, it is advantageous to process images differently. If a new user is searched in an image, e.g. the whole image can be scanned for determining, whether there is a new face or a new pair of eyes or the like. If a user has already been detected and eye tracking is performed on the basis of the captured images, the approximate position of the eyes of the found user in a newly captured image is already known as the eyes' position usually does not vary much from image to image. So if an image is captured for eye tracking purpose, the processing unit starts to search for the eyes of the user at a position, in which the eyes have been detected in the previous image and usually only a small portion of the captured image has to be searched until the new position of the eyes is found again. So for the purpose of detecting new users it may be advantageous to scan the whole image, whereas for tracking an already detected user, scanning to whole image is not necessary and only part of the image may be analyzed. Another alternative for searching for new users is instead searching in the entire image at specific intervals to search in a small part of the image in every frame and change the part that is being searched at periodic intervals, adapting the different properties mentioned above accordingly. This has the advantage that not the whole image has to be searched. So to better adapt to the requirements of searching users and tracking users respectively, it is a very advantageous embodiment of the invention to define different states of the eye tracking device and to process images according to these states.

So, preferably, each of the captured images is assigned to at least one of the following predefined states:
 a user search state;
 an eye tracking state; and
 an eye tracking and user search state;
wherein the images are processed in dependency on the assigned predefined state, especially wherein if one of the images is assigned to the user search state, the processing unit checks whether the first and/or second user and/or any further user is present in one of the images, and if one of the images is assigned to the eye tracking state, the processing unit determines the gaze direction and/or point of regard of the first and/or second and/or any further user based on eye features detected in that one image, and if one of the images is assigned to the eye tracking and user search state, the processing unit determines a gaze direction and/or point of regard of the first user based on eye features detected in that one image and the processing unit checks whether the second user and/or any further user is present in that one of the images at the same time. Also additional states can be defined, like a default state, in which none of the previously described steps is performed.

So if an image, or generally a frame, which is the step of capturing and processing an image, is assigned to a user search state, the image captured in that frame is checked for new users. If an image is assigned to the eye tracking state, eye features of an already detected user are derived from this image, and if an image is assigned to the combined state, namely the eye tracking and user search state, this image is used for deriving the eye features relating to an already detected user, and is also used for searching for new users. Depending on the predefined state, an image is assigned to, these images are processed differently. If for example an image is assigned to the user search state, the whole image may be roughly scanned for detecting new users. If an image is processed in the eye tracking state, only part of the image may be analyzed, e.g. starting at a position, at which the eyes of the already detected user were found in the previous image, and in the eye tracking and user search state, both analysis procedures of processing the image are combined.

So, if at the beginning no user has been detected, the eye tracking device can be in the user search state until the first user is found. After the first user has been detected, the eye tracking device can either alternate in predefined manner between the eye tracking state and the user search state, or can alternate in predefined manner between the eye tracking state and the combined eye tracking and user search state, or can also be permanently in the eye tracking and user search state. So for example, if the first user has been detected, the eye tracking device can skip to the eye tracking state for tracking the eyes of the found user and for example every third image switches to the user search state or the combined eye tracking and user search state, where the image is either only used for searching for new users or additionally used for searching for new users. If after some time the detected first user leaves the capturing area, the eye tracking device can switch again to the user search state until again a new user is found. This procedure can be performed advantageously for any number of users. If for example three users have been detected, the eye tracking device can determine the gaze direction and/or point of regard of each of the users at the same time, especially on the basis of the same image, e.g. in the eye tracking state, or in the combined eye tracking and user search state, and again it can be searched periodically for new users.

Being permanently in the eye tracking and user search state if at least one user has already been detected has the great advantage that new users can be found very quickly, as every image is used for eye tracking of the found users as well as for searching for new users. On the other hand, searching for new users on the basis of, e.g. every second image or every fifth image has the advantage that the computation time for processing time processing the images can be shortened. These many possibilities can be adapted advantageously to different situations. If for example usually the eye tracking device is used by two users and already two users have been detected, the eye tracking device can skip only from time to time to the user search state or the combined state, because it is unlikely that further users will join. If the eye tracking device is used by multiple and frequently changing persons, it may be preferred to be permanently in the eye tracking and user search state (if already at least one user had been detected) to be able to detect further users very quickly.

According to another very advantageous embodiment of the invention the processing unit controls at least one component of the eye tracking device in dependency on the current predefined state. This is very advantageous, because this way the settings of the eye tracking device and its components can be optimized for searching users or tracking users or both. For example images captured for searching for users can be captured with a lower resolution, whereas images captured for tracking the eyes of an already detected user can be captured with higher resolution. So for each predefined state of the eye tracking device specific settings of the components of the eye tracking device can be chosen.

Thereby, the at least one component may be the imaging device and/or an illumination unit for illuminating at least part of the predefined capturing area. This way advantageously the image capturing can be adapted to the respective state in which the images are captured and also the illumination conditions can be optimized for each state.

In this regard it is a very advantageous embodiment of the invention when the processing unit controls the illumination unit such that illumination properties of the illumination unit, especially an illumination area and/or an illumination intensity and/or an illumination spectrum and/or the kind of light source used for illumination is adjusted in dependency of the current predefined state. For example, for images assigned to the eye tracking state the illumination unit can be controlled such that light emitted by the illumination unit is focused on a predefined region of interest, especially which is only a subsection of the predefined capturing area of the imaging device. This region of interest can be predefined on the basis of the expected position of the eyes of a user. This expected position can be determined on the basis of the position the eyes of the user in the previous image(s). The same applies if multiple users have been detected by the eye tracking device, so when the eye tracking device is in the eye tracking state for tracking the eyes of several users, the illumination unit can be controlled such that for each user a region of interest, which is predefined on the basis of the expected position of the eyes of each user, respectively, is illuminated. On the other hand, for images, which are assigned to the user search state, the illumination unit is controlled such that a region is illuminated, that is bigger than the above-named region of interest, and preferably includes the whole capturing area of the imaging device. As in the user search state captured images may be scanned as a whole for detecting new users, it is very advantageous that the whole capturing area, of which the images are captured, is illuminated. Also, in the eye tracking state the illumination unit can be controlled such that the illumination intensity is greater than for example for images captured in the user search state. So, advantageously, the eye tracking accuracy can be enhanced by providing a good illumination of the region of interest in the eye tracking state and at the same time in the user search state power can be saved by reducing the illumination intensity.

Also respective settings can be chosen for the combined user search and eye tracking state, for example, the illumination unit can be controlled such that for capturing images in this combined state the whole capturing area is illuminated by the illumination unit, and additionally the predefined regions of interested are illuminated with higher intensity. Similar advantageous adjustments and adaptions can be achieved by controlling the imaging device in dependency of the current state of the eye tracking device. For example the processing unit can control the imaging device such that imaging properties of the imaging device, especially the predefined capturing area and/or a gain of the imaging device and/or a focus value of the imaging device is adjusted in dependency on the current predefined state. For example for capturing images in the eye tracking state the imaging device can be controlled such that the gain is greater than for images assigned to the user search state. Therefore better results can be achieved for eye tracking. Also in the eye tracking state the imaging device may be controlled such that a higher focus value is set, so that the imaging device focuses on the region of interest for one of more already detected users and for the user search state, the focus can be adjusted such that the capturable area is maximum. Therefore, also the predefined capturing area of the eye tracking device, or especially of the imaging device, can be adjusted in dependency on the current state of the eye tracking device.

According to another advantageous embodiment of the invention, if the first and/or second user is detected in one of the captured images, the processing unit derives user specific data from that image and compares the derived data with data of at least one stored user profile, and if the derived data match the data of the at least one stored user profile, the first and/or second user is determined to be an authorized user. This automatic user identification is especially advantageous with regard to multi-user eye tracking. On the one hand, this makes it possible that only authorized users may use the eye tracking device and on the other hand user-specific data stored in the user profile can be automatically derived from the storage medium and used for eye tracking of the identified user. For eye tracking usually meta information about the currently tracked user is used. This meta information can for example be derived from a calibration procedure at the beginning of a session. Such meta information may contain geometric properties about the user, especially for identifying the user later on and also his eyes, and especially the offset between the visual axis and optical axis. This offset varies from person to person and needs to be known for correctly calculating the gaze direction. So advantageously after a user is identified on the basis of a profile eye tracking data like the offset can be used for tracking the eyes of this identified user and calculate his gaze direction. The meta information also can comprise information about whether a user is wearing glasses or not. So for this purpose the eye tracking device can comprise a storage medium where the user profile and the corresponding meta information for each of the users can be stored. If then the eye tracking device detects a user in the captured images, it can first check whether some matching condition with regard to the stored profiles is fulfilled and if yes, the eye tracking device can start tracking the eyes of the user by using the meta information stored for this user in his profile.

Alternatively or additionally, for identifying users, user characteristics cannot only be captured on the basis of the captured images but also by other means like by means of a microphone capturing the voice characteristic of a user and comparing it to a voice profile. So, in general, for identifying a user one or more characteristics of the user can be captured, like a face characteristic and/or a body characteristic, especially at least one geometric property of the at least one user and/or an eye characteristic, especially a geometric property of the at least one eye and/or a part of the at least one eye, and/or an eye motion pattern and/or whether the at least one user is wearing glasses and/or a refractive power of the glasses or a voice characteristic.

Moreover, by means of such automatic user identification, by means of which authorized users can be determined, at the same time unauthorized persons can be detected as well. If the eye tracking device detects a new person in an image and then checks whether the detected person is an unauthorized person according to a predefined criterion, like there is no match with a stored user profile, then the eye tracking device can output a signal, like a warning signal, especially an optical and/or acoustical and/or haptic signal, wherein the signal can for example be outputted on a display device or another component of the eye tracking device or a loudspeaker. The signal can also cause disabling the display device of the eye tracking device or shutting off the display device or changing the content shown on the display device. Therefore multi-user eye tracking can be performed in a very safe way.

According to another advantageous embodiment of the invention, the eye tracking device comprises a display device, wherein the processing unit controls the display device in dependency of the first and second information such that at least one first screen content is shown on the display device in dependency on the first information and the second screen content is simultaneously shown on the display device in dependency on the second information. This allows in a very advantageous way different users to use a common screen or display and to control the screen content, for example in dependency on the respective gaze direction. So the screen content can for example be a mouse cursor, especially wherein for each detected user a respective cursor is shown on the display device and each user can use and control his own cursor by means of his gaze direction. Also different screen sharing and screen multiplexing techniques can be used to provide screen content for each user respectively. For example in a first area of the screen surrounding a first determined gaze point of a first user, a first screen content can be shown and in a second area surrounding the second gaze point of a second user, a second and different screen content can be shown. The first and second screen content can also be provided by different applications. Therefore, advantageously, the eye tracking device for multiuser eye tracking can be used also for providing applications on a display device, which can be used and controlled by each of the tracked user separately.

The invention further relates to an eye tracking device for multiuser eye tracking, wherein the eye tracking device comprises an imaging device configured to capture images of a predefined capturing area of the eye tracking device, a processing unit configured to process the captured images, wherein the processing unit is configured by processing the images, if a first user and a second user are present in the predefined capturing area of the eye tracking device, to determine a first information relating to the first user and a second information relating to the second user on the basis of the captured images. The processing unit is further configured to control the imaging device such that the images are captured successively in a predeterminable time sequence.

The preferred embodiments and advantages thereof described with regard to the method for operating an eye tracking device according to the invention correspondingly apply to the eye tracking device according to the invention, wherein in particular the embodiments of the method constitute further preferred embodiments of the eye tracking device according to the invention.

Moreover, the eye tracking device according to the invention can be configured as a remote eye tracker, configured to measure the position and/or orientation of a user's eyes. The eye tracking device can be combined for example with a computer and delivers in real time the position of the user's eye in front of a monitor, the gaze direction, and/or the position of the viewed object, usually a point of regard on a monitor.

Further features of the invention and advantages thereof derive from the claims, the figures, and the description of the figures. All features and feature combinations previously mentioned in the description as well as the features and feature combinations mentioned further along in the description of the figures and/or shown solely in the figures are not only usable in the combination indicated in each place but also in different combinations or on their own. The invention is now explained in more detail with reference to individual preferred embodiments and with reference to the attached drawings.

Figure 2:
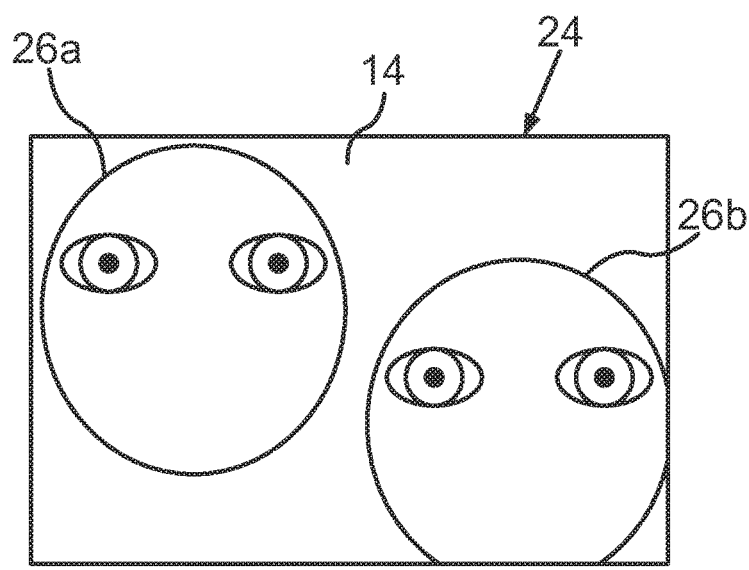
Figure 3:
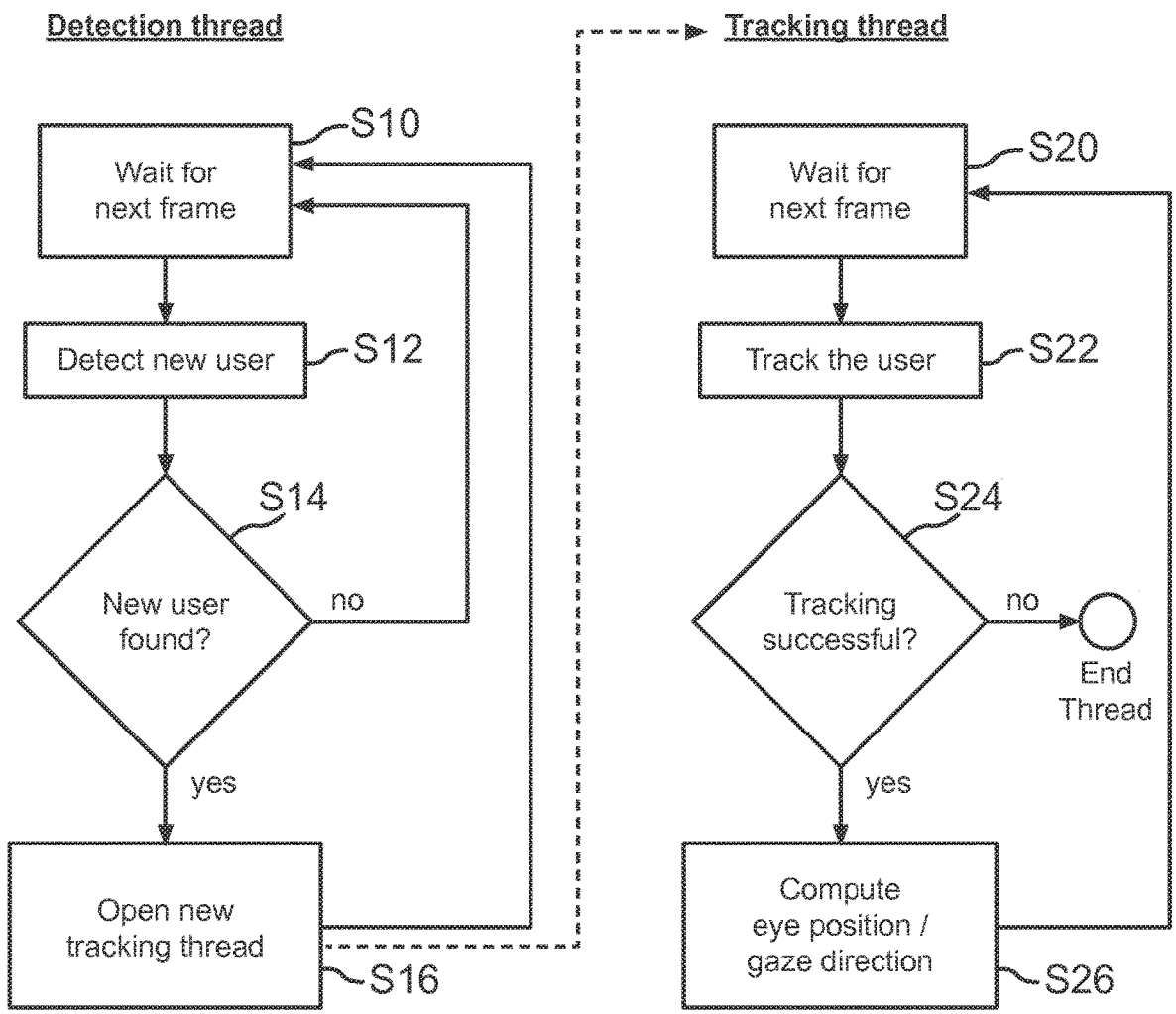
Figure 4:
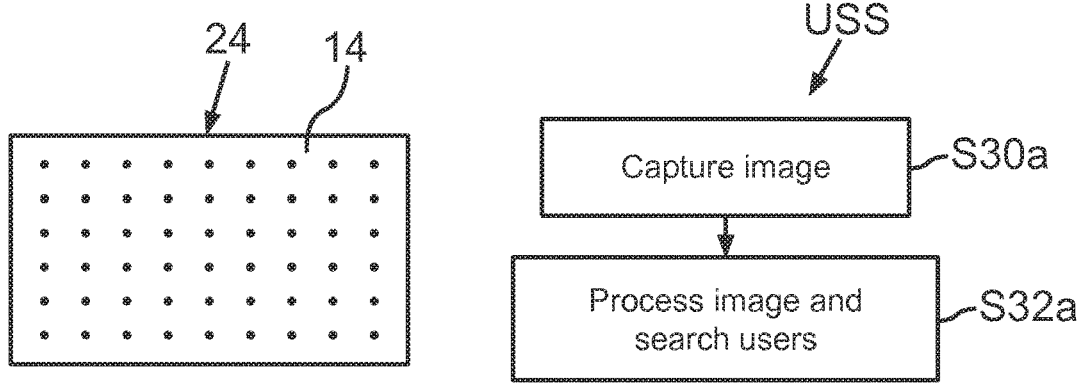
Figure 5:
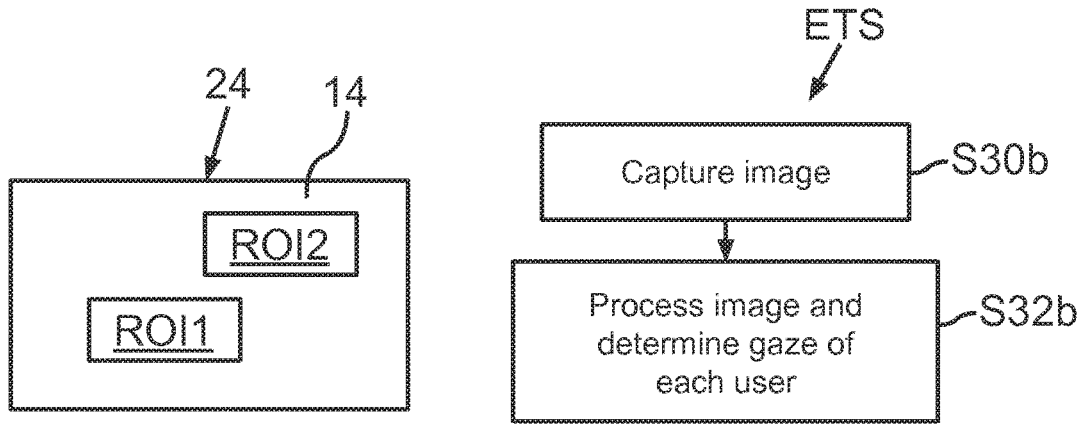
Figure 6:
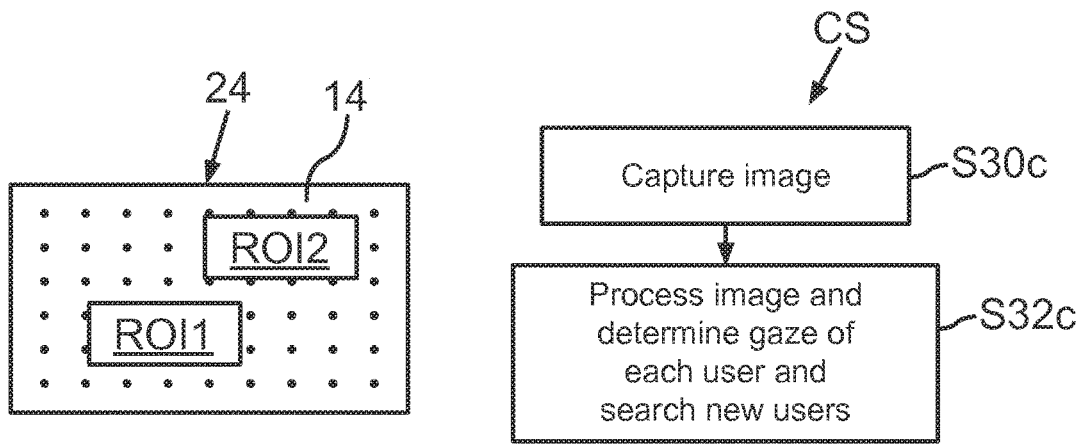
Figure 8:
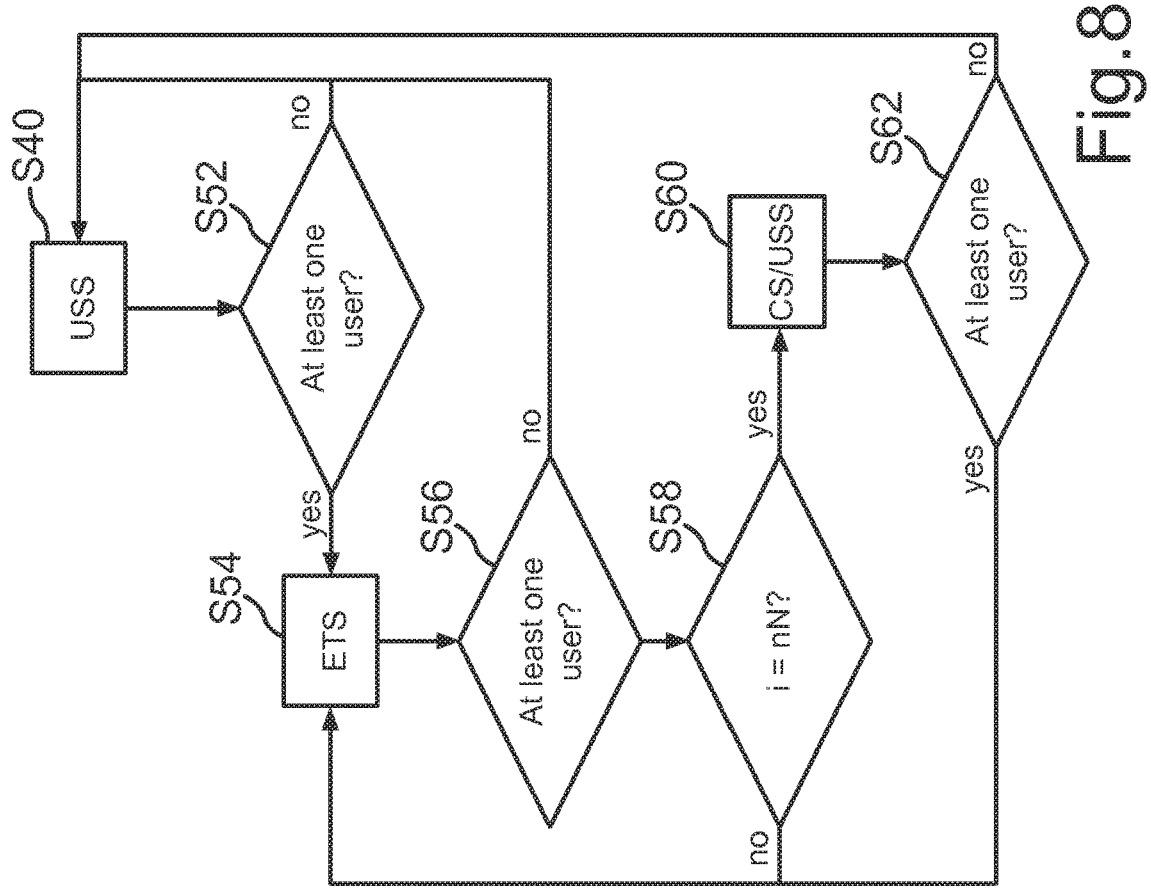
Figure 7:
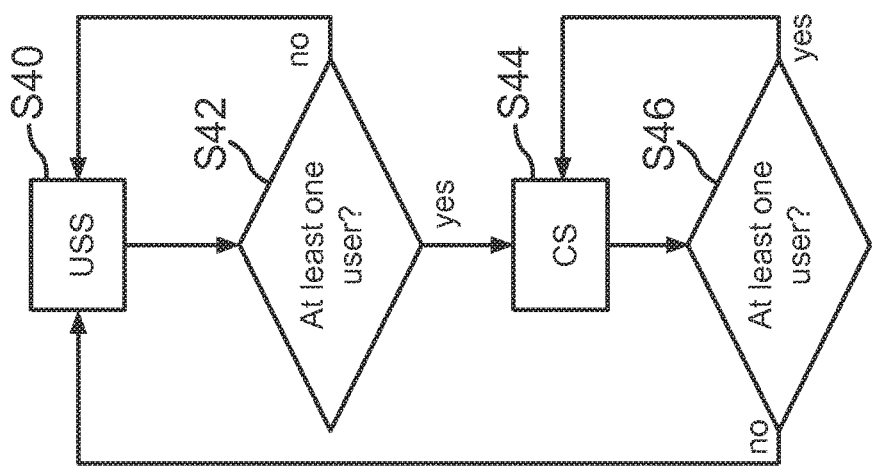
Figure 9:
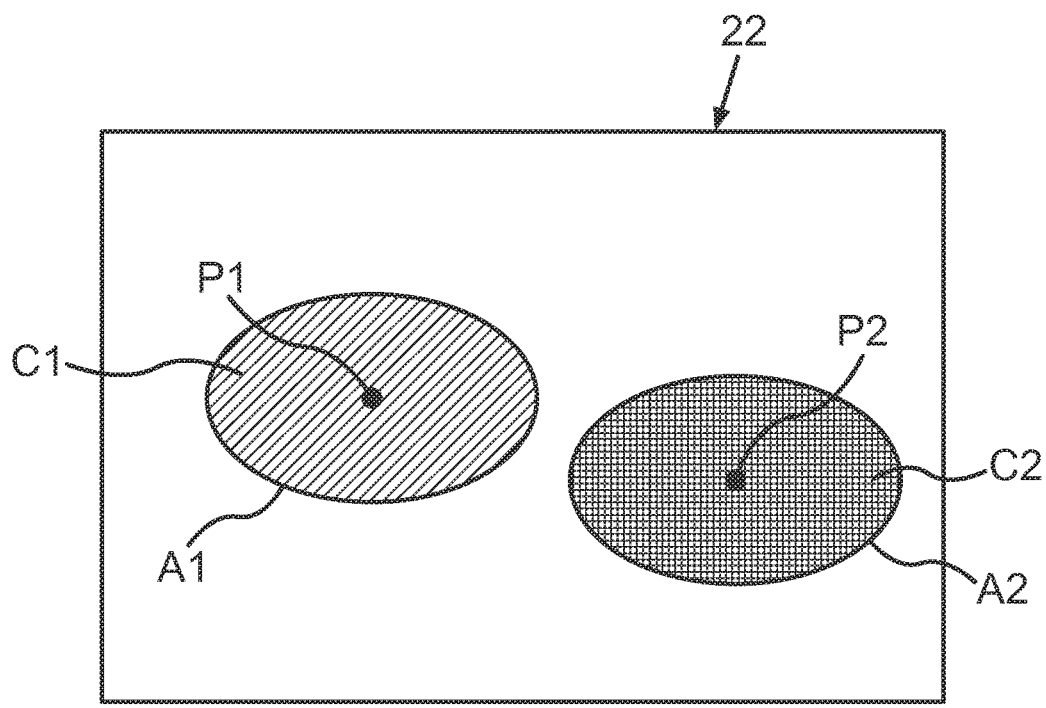

These show in:

FIG. 1 a schematic illustration of an eye tracking device for a multiuser eye tracking according to an embodiment of the invention;

FIG. 2 a schematic illustration of an image captured by the eye tracking device according to an embodiment of the invention;

FIG. 3 a schematic illustration of a method for operating an eye tracking device for multiuser eye tracking according to an embodiment of the invention;

FIG. 4 a schematic illustration of a user search state of the eye tracking device according to an embodiment of the invention;

FIG. 5 a schematic illustration of an eye tracking state of the eye tracking device according to an embodiment of the invention;

FIG. 6 a schematic illustration of a combined state of the eye tracking device according to an embodiment of the invention;

FIG. 7 a flow chart illustrating a method for operating an eye tracking device according to an embodiment of the invention;

FIG. 8 a flow chart illustrating a method for operating an eye tracking device according to another embodiment of the invention; and FIG. 9 a schematic illustration of a screen of an eye tracking device for providing multiuser applications according to an embodiment of the invention.

Eye tracking, which allows multiple users to be tracked at the same time, must pay attention to several special situations. For single user eye trackers, a common technique is to separate detection and tracking of eyes. Once a user is found, the device switches to a tracking mode, which tracks the found user, his face or his eyes over time. In order to save computing time and transmission bandwidth, this is often combined by capturing images only in the vicinity of the already found user, e.g. by using a hardware, region of interest of the camera, or by using pan-tilt zoom cameras facing them to the tracked user. This concept needs to be adapted for multiuser eye tracking.

First of all, an eye tracking device and its components is described with regard to FIG. 1. FIG. 1 shows a schematic illustration of an eye tracking device 10 for multiuser eye tracking according to an embodiment of the invention. This eye tracking device 10 is configured as a remote eye tracker, which comprises an imaging device 12, e.g. a camera or an image sensor, having a predefined capturing area 14 and a processing unit 16. The imaging device 12 captures images of the predefined capturing area 14, which are then processed by the processing unit 16. The eye tracking device 10 may further comprise an illumination unit with optional light sources 18 for illuminating at least part of the capturing area 14. Additionally, the eye tracking device 10 can comprise a storage medium 20 and a display device 22.

The concept of multiuser eye tracking, explained in more detail below, works for any kind of remote eye tracker, independently of the technique, whether it is based on infrared light or visible light, whether it has additional light sources and tracks corneal reflections, or not. Preferably, the eye tracking device 10 comprises an imaging device 12 with a camera having a wide opening angle to provide a large capturing area 14 to be able to see multiple people. For example a wide angle camera can be used as imaging device 12, or also the imaging device 12 can comprise several cameras, the capturing areas of which are composed to one capturing area 14 of the imaging device 12.

So, by means of such an imaging device 12 images can be captured of the capturing area, in which several users may be present. This is illustrated in FIG. 2, which shows an image 24 captured by the imaging device 12, in which exemplarily two users 26a, 26b are visible. By processing captured images 24, the processing unit 16 detects visible faces and/or eyes in the image 24. If a new face, user and/or pair of eyes is found, the device starts to track that user, especially in consecutive images and the local change of the detected user and his eyes is computed.

The main problem of a multiuser eye tracker is the handling of special issues, which only occur when the device may track several users at once. These special issues are the detection of new users as well as the identification of users, which is explained later. With regard to detecting new users, the usual distinction in eye trackers between detecting a user and tracking his eyes must be handled differently. It is possible (and even likely) that one user starts using the eye tracking device and another joins later. The eye tracking device must therefore be able to detect new users, even when it is already tracking another user. Therefore, conventional techniques, which e.g. use the region of interest mode of the camera and only capture a small region of interest around the user's eyes or techniques using a pan-tilt zoom camera and zoom to the eyes of a user would not work for multiple users without adaption.

According to an embodiment of the invention, when the eye tracking device 10 is already tracking a first user, the eye tracking device 10 at the same time scans the captured images 24, especially the whole images for new users, which may enter the scene, e.g. enter the capturing area. Each newly detected user starts a new tracking process so that multiple users may be tracked at the same time. This is illustrated in FIG. 3.

FIG. 3 shows a schematic illustration of a method for operating an eye tracking device according to an embodiment of the invention. This method can be logically separated in a detection thread for detecting new users, shown on the left side of FIG. 3, and a tracking thread for tracking detected users, shown on the right side of FIG. 3. This method starts in step S10, in which the processing unit 16 waits for the next frame, namely the next image 24, which shall be analyzed with regard to new users. If such an image is received from the imaging device 12, the processing unit 16 checks whether new users are present in this image 24 in step S12. If in step S14 no new users were found, these steps are repeated again beginning in step S10. If in step S14 one or more new users were found, a new tracking thread is opened for each new user in step S16 and the detection thread is repeated starting again from step S10.

The tracking thread, which is started for each new user, runs parallel to the detection thread and comprises the following steps: The tracking thread starts in step S20, where again the processing unit 16 waits for the next frame, namely the next image 24 captured by the imaging device 12, on the basis of which one or more detected users shall be tracked. After receiving such an image 24 the processing unit 16 tracks the user in step S22, which means the eye positions in the image 24 are found similar to existing eye tracking techniques. Next, in step S24 it is checked whether the user was successfully tracked. If yes, properties of the eyes, like position, eye orientation and a gaze direction and a point of regard are computed and this procedure starts again in step S20. If the tracking was not successful in step S24, for example if the user has left the capturing area 14, the tracking thread is terminated. So for each detected user, especially detected by the described detection thread, a new tracking thread is opened so that multiple users can be detected and tracked at the same time. The eye tracking device 10 finally provides one set of data per frame containing eye position and a gaze direction and a point of regard for each user, which is currently tracked. The user detection and user tracking can be performed on the basis of the same captured images, but also on the basis of different and consecutively captured images, which will be explained in more detail in the following.

As the requirements for image processing may vary depending on whether an image shall be used for detecting new users or tracking found users or both it is very advantageous to define different states of the eye tracking device 10 and to assign each captured image 24 to a corresponding state and to process the images in dependency on the assigned state of the eye tracking device 10. These different states are explained now in the following with regard to FIG. 4, FIG. 5, and FIG. 6.

FIG. 4 illustrates a user search state USS. In this state an image 24 is captured in step S30a and processed by the processing unit 16 in step S32a. When processing an image assigned to the user search state USS, the processing unit scans the whole image 24 for users, e.g. checks whether faces, eyes, pairs of eyes are present in that image 24. This image analysis is schematically illustrated on the left side of FIG. 4. The shown points in the illustrated image 24 shall illustrate that the processing unit 16 roughly scans the whole image, therefore the whole capturing area 14, for new users.

FIG. 5 shows a schematic illustration of an eye tracking state ETS of the eye tracking device 10. The image 24 captured in step S30b in the eye tracking state ETS is then also processed by the processing unit 16 in step S32b, however not for searching new users, but for tracking already found users, and e.g. determine there respective gaze direction of each of the users. For determining a gaze direction or point of regard or other properties of the eye a captured image 24 has to be analyzed with regard to specific eye features, like a position of the eyes in the images 24, the pupil position, the position of glints and so on. The processing of images 24 in the eye tracking state ETS is illustrated on the left side of FIG. 5. In the eye tracking state ETS not necessarily the whole image 24 has to be analyzed, but the analysis can be restricted to defined regions of interest. Here exemplarily a first region of interest ROI1 and a second region of interest ROI2 are schematically shown in the image 24. These regions of interest ROI1, ROI2 are determined on the basis of expected eye positions of already detected users. If, like in this case, two different users have already been detected, for example in the user search state USS, the crude position of the eyes of the respective user can be estimated from previously captured images 24. So when processing images 24 in the eye tracking state ETS, the processing unit 16 can start searching the eyes of the respective users beginning in the defined respective regions of interest ROI1, ROI2, as it is very likely to find the eyes of the respective users in these regions of the image 24, so that computing time can be saved. If the respective eyes of each of the detected users can be found in these regions of interest ROI1, ROI2 eye properties or the gaze direction can be determined for each of the users without having to analyze other parts of the captured image 24.

Both of these states can also be combined, which is illustrated in FIG. 6. FIG. 6 shows a schematic illustration of a combined state CS, which is a user search and eye tracking state. In this state CS an image 24 is captured in step S30c and processed by the processing unit 16 in step S32c, wherein by processing the captured image 24 already detected users can be tracked and at the same time the image 24 can be searched for new users. This is again schematically illustrated on the left hand side of FIG. 6. In this case the processing unit 16 starts searching for the eyes of the already detected users in the respective regions of interest ROI1, ROI2 and additionally analyzes the remaining image parts for new users. Another alternative is instead of searching for users in the entire image 24 is to search in a small part of the image 24 in every frame and change the part that is being searched at periodic intervals. So the whole capturing area 14 can be scanned over time, e.g. over a predefined number of successively captured images 24.

The eye tracking device 10 can advantageously switch between these states to adapt to different situations. Furthermore, it is not only advantageous to process images 24 in dependency of these predefined states, but optionally also to control other components of the eye tracking device 10 in dependency of the current state of the eye tracking device 10. Such components can be for example the illumination unit with the light sources 18 and/or the imaging device 12. For example in the user search state USS the illumination unit can be controlled such that the whole capturing area 14 is illuminated, wherein in the eye tracking state ETS the illumination can be focused on the already detected users to better illuminate the corresponding regions of interest ROI1, ROI2. Also for the combined state it is very advantageous to provide more light intensity in the regions of interest ROI1, ROI2 than for the remaining capturing area 14. In a similar way also the imaging device 12 can be adjusted in dependency of the current state of the eye tracking device 10. So for example in the eye tracking state the gain, focus, or capturing area 14 can be concentrated on the respective regions of interest ROI1, ROI2 to achieve better eye tracking results. Moreover the following table shows some exemplary settings for the user search state USS, also called detection state and the eye tracking state ETS:

| Detection State USS | Tracking State ETS |
| --- | --- |
| Global Illumination | Localized Illumination |
| Large Region of Interest | Localized Region of Interest |
| Gain for Optimal Detection | Gain for Optimal Tracking |
| Overview Camera | Zoom Camera |
| All Illumination sources | Specific Illumination Sources |

For the last two examples a multi camera and a multi illumination system can be used.

In the following some embodiments will be presented, in which the different states of the eye tracking device 10 are combined in a very advantageous way. FIG. 7 shows a flow chart for illustrating a method for operating an eye tracking device 10 according to a first embodiment of the invention. This method starts in step S40, which is the user search state USS, explained with regard to FIG. 4. In step S42 it is checked whether at least one user is present in the image 24 captured and processed in the user search state USS. If no user has been found, the method goes back to step S40 and the eye tracking device 10 stays in the user search state USS. If at least one user has been found in step S42, the eye tracking device 10 switches to the combined state CS in step S44, in which a captured image 24 is used for tracking already found users as well as for searching for new users. In step S46 it is checked whether at least one user is present in the last captured image 24. If yes, the method returns to step S44 and the eye tracking device 10 stays in the combined state CS. As long as users are present in the captured images 24, eye features, gaze directions and so on of the detected users are determined on the basis of the captured images 24 and additionally each image 24 is checked as to whether new users are present. If new users are found in the captured images 24 during the eye tracking device 10 being in the combined state CS, also properties, gaze directions, and so on of these new users are determined in this combined state CS. These steps are repeated as long as users are present in the capturing area 14. If all of the users left this capturing area 14 and no user is detected in step 46 anymore, the eye tracking device 10 switches back to the user search state USS in step S40 and the method starts all over again. This method has the great advantage that new users can be detected very quickly, as in the combined state CS each image, which is used for tracking already found users, is also used for searching for new users.

FIG. 8 shows another flow chart for illustrating a method for operating an eye tracking device 10 according to another embodiment of the invention. In the beginning of this method the eye tracking device 10 again is in the user search state USS in step S50. As long as no users are found on the basis of captured images 24, which is checked in step S52, the eye tracking device 10 stays in the user search state USS. Otherwise, if at least one user is found on the basis of an image 24, the eye tracking device 10 switches to the eye tracking state in step S54. In this eye tracking state ETS as already explained the found users are tracked on the basis of captured images 24. During the processing of each image 24 in the eye tracking state ETS it is checked in a step S56 if still at least one user is present. If not, the eye tracking device 10 switches back to the user search state USS in step S50. If still at least one user can be tracked, it is further checked in step S58, if a predefined number of images has already been captured in the eye tracking state ETS. Here in FIG. 8 i denotes the number of the image captured in the eye tracking state ETS and n and N denote integers, wherein N is a fixed integer, like 5, and n can be an arbitrary integer. So if N for example is 5, the eye tracking device 10 switches for every fifth captured image to either the combined state CS or the user search state USS in step S60. In this state an image is captured for searching for new users, either only, like in the user search state USS, or additionally to tracking found users, as in the combined state CS. After that it is checked in step S62 again whether at least one user is still present, if not, the method again begins in step S50, and, if yes, the eye tracking device 10 again switches to the eye tracking state ETS in step S54. If in step S60 new users were found also these new users are tracked in the subsequent eye tracking state ETS in step S54. So according to this embodiment, if at least one user is present in the captured images, this user is tracked. Furthermore, if new users are detected, also these new users will be tracked. However, the user detection is not performed for each of the captured images, but only after a predefined number of captured images, like every second image, every third image and so on. Thereby, advantageously, computing time can be saved.

Another aspect of the invention, which shall be explained in the following, is the user identification. Most eye trackers use meta information about the currently tracked user. Typically, a calibration procedure at the beginning of a session is used to collect such information. It may contain geometric properties about the user, his eyes, the offset between the visual axis and optical axis, whether he/she is wearing glasses etc. While this information can be treated as constant meta data for single user eye trackers, the situation is different for a multiuser eye tracking where users may leave and re-enter the scene all the time. Therefore it is a very advantageous embodiment of the invention that the tracking device 10 is configured to identify new users in order to use user specific data. For this purpose first of all a calibration procedure can be performed, which is a very important aspect of achieving high accuracy in eye tracking. Every user is different, though, so each individual needs to perform its own calibration sequence to obtain a different set of correction parameters. For this purpose, a calibration procedure can be run for each user and thus gaze correction data can be obtained for each user respectively. Thereby, also for each user characteristics for identifying a respective user later on can be captured. These sets of user identification data and gaze correction data can be stored in the storage medium 20 of the eye tracking device 10 in a corresponding user profile. Also calibration procedure can be performed by means of the eye tracking device 10 on two or more persons at the same time.

These stored profiles can now be used advantageously to identify users again. When multiple people are sitting in front of the same eye tracking device 10, it will be advantageous to match calibration information with the correct individual. Incorrectly matching user and gaze correction data will cause a large error in the point of regard of the individual. Therefore, it is very advantageous, when the processing unit 16 is configured to identify new detected users on the basis of user characteristics, which may be derived from the captured images and to match these characteristics with a corresponding user profile and use the eye tracking data stored in this user profile for eye tracking of this identified user.

According to another embodiment of the invention, in a multiuser system, like the multiuser eye tracking device 10, users might have different rights. Some examples for this are:

- In a development environment where person A helps person B. In this scenario person A should only have the right to point, whereas person B should still have control of the system.
- In a household situation in front of a TV only one person should have the right to change the channel, similar to their being only a single remote control. If this is not the case, this could cause frustration and incorrect selections of channels.
- Some individuals might have permissions on some parts of the screen, whereas on other parts they are not allowed to perform any changes, depending on the currently active windows.

Therefore it is very advantageous when, according to another embodiment of the invention, such permission data, rights, or priority data for each user of the eye tracking device are stored additionally in the corresponding user profile. If a user is detected by the eye tracking device 10 and identified on the basis of his profile, the permission data can be derived and the eye tracking device can decide which tasks the user is allowed to perform e.g. by means of gaze control according to his/her permissions.

Furthermore, it may be useful to know if a third party is looking at a screen or not. This can be in security-related situations, where it is important to not allow other people to see what is being shown on a screen, like the display 22 of the eye-tracking device 10. On the basis of the stored user profiles unauthorized persons can also be detected and identified as such by means of the eye tracking device and different actions can be performed to ensure security. For example a warning can be provided and outputted by the eye tracking device 10 to the main user, the screen 22 can be disabled temporarily, some fake data or different screen content can be shown on the display 22, some kind of inverted foveated rendering can be performed, in which in the area around the gaze point of the unauthorized person a default image is shown instead of the actual content. This will only affect the usage of the display 22 of the main user in situations where both the main user and the unauthorized person look at the same point.

Furthermore, some embodiments of the invention will be described which relate to very advantageous multiuser applications. There is a wide variety of situations, environments and places, in which multiple people look at the same screen, like the display 22 of the eye tracking device 10. Here a few sample applications, for which multiuser eye tracking in front of a single device, especially a single display 22, is useful and can greatly enhance the experience of the user or simplify the fulfillment of tasks.

For example the calculated point of regard of a first user can be shown on the display 22 as a pointing device to create interest for a second user. Often the situation occurs that the person a wants to draw person's B attention to a specific part of the screen 22. Instead of person A pointing with a finger or a mouse cursor, according to this embodiment of the invention, it is possible to use the respective point of regard as a method of growing attention to a location or event.

According to another embodiment foveated rendering can be used to reduce the amount of computation and energy being used by a screen 22 by limiting the area of the screen, on which data is displayed to those parts where the user is actually looking. The area close to the focusing area of the user will here be called core. Areas further away will be called peripheral. There are multiple ways that the core and the peripheral area can be treated depending on the usage scenario. For example, in a 3D rendering situation the core can be rendered with high quality, whereas peripheral areas are rendered with lower quality. In some scenarios it will even be possible to show some default content in peripheral areas, e.g. a black image to save power for illumination. The border between the core and peripheral areas can also be dealt with in many different ways, e.g. using medium quality rendering, blurring or even a hard edge. With multiuser eye tracking foveated rendering could be done for multiple individuals on the same screen 22.

This is schematically illustrated in FIG. 9. Here a situation is shown, where two users of the eye tracking device 10 are looking at the display screen 22. The eye tracking device determines the point of regard of each user on the screen 22. The respective points of regard are here denoted by P1 and P2. These points of regard P1, P2 are shown in FIG. 9 only for illustrative purpose and are not really presented on the display screen 22. Furthermore, screen content C1, C2 is only shown in a predefined area A1, A2 surrounding the respective points of regard P1, P2. By this advantageous embodiment two or more people can share the same screen 22, and even for each of them different screen content can be shown, for example one is reading a book and the other is watching a video. So the different screen content C1, C2 referring to the respective user, can also be provided by different applications running on the eye tracking device or the computer, the eye tracking device 10 is coupled with. This works in a similar way as foveated rendering, except that each person has its own virtual desktop, and on the screen 22 it is being displayed in a foveal radius around a given person's determined point of regard P1, P2 a portion of the virtual desktop which matches that user. As long as latency is low and the points of regard P1, P2 of both users do not simultaneously overlap, the users will have the illusion of each of them looking at an own screen 22. Technically this can be achieved in many different ways, one option being the use of one virtual screen for each user and a mask that decides, which virtual screen content C1, C2 is displayed for each pixel. Between these virtual screens a blurred border can be used to allow for a slightly less sharp edge between the two virtual screens.

To decide which virtual screen is shown on which pixel of the display 22 there are a few alternative decisions that can be taken, especially when multiple users are looking into the same area of the screen 22. For example for each pixel it can be decided which point of regard P1, P2 is closer and the virtual screen can be picked accordingly. Additionally, a blurred edge between the two virtual screens can be shown. Alternatively, an area around each point of regard P1, P2 is shown with the respective virtual screen. Optionally, in a conflict area the images can be blurred with some transparency value.

Further use cases for multiuser eye tracking are for example games, TV control, telephone conferences or use in surgery rooms. With regard to games, in the past many games used to be played with multiple people sitting at the keyboard triggering actions in the game using different keys. Instead of two people using the same keyboard, it will be possible to control their characters using gaze instead. The idea of games with multiuser eye tracking can be particularly interesting for social evenings in an assistive environment. This would allow playing software versions of board games such as chess and checkers, or monopoly and risk as two more complex examples by maintaining the social element of games evening.

In a TV scenario multiple people sit in front of the display 22. Each individual might want to change the currently active settings of the TV, such as the channel, volume etc. With a multiuser eye tracking system, like the eye tracking device 10 according to this invention it is possible to realize a TV that enables each user to control all or a subset of the settings.

Also online call systems like skype can add a feature to show where a person in a phone conference is looking. This can be used for creating interest, but is can also be used for other purposes, such as setting the volume specifically on the person that has the attention of the user and reducing the volume for others.

With regard to the use in surgery rooms, in a surgery setting multiple doctors and assistants might require different information from a screen. Using multi-gaze tracking any individual can set what is on a screen or part of a screen.

So, according to the invention and its embodiment a method for operating an eye tracking device for multiuser eye tracking and a multiuser eye tracking device are provided, which make it possible that multiple users can be tracked at the same time in a very simple and easy way. This can be used in a wide variety of applications, some of which are mentioned above.

LIST OF REFERENCE SIGNS

10 eye tracking device
12 imaging device
14 capturing area
16 processing unit
18 light source
20 storage medium
22 display
24 image
26*a*, 26*b* user
ROI1, ROI2 region of interest
P1, P2 point of regard
C1, C2 screen content
A1, A2 predefined screen area
USS user search state;
ETS eye tracking state;
CS eye tracking and user search state;

The invention claimed is:

1. A method comprising:
    capturing a first set of one or more images;
    determining a value of a user search parameter based on one or more numbers of detected users in the first set of one or more images;
    capturing a second set of a plurality of images;
    classifying, based on the user search parameter, each of the second set of the plurality of images into one or more of a plurality of states comprising a user search state and an eye tracking state, wherein a first one of the second set of the plurality of images is classified into the eye tracking state without being classified into the user search state and a second one of the second set of the plurality of images is classified into the eye tracking state and is classified into the user search state;
    performing, for each of the second set of the plurality of images classified into the eye tracking state, eye tracking upon a representation of a detected user; and
    searching, in each of the second set of the plurality of images classified into the user search state, for a representation of user.

2. The method of claim 1, wherein the user search parameter is based on a number of currently detected users.

3. The method of claim 2, wherein a particular one of the second set of the plurality of images is less likely to be classified into the user search state when the number of currently detected users is greater.

4. The method of claim 1, wherein the user search parameter is based on an average number of detected users over a predetermined time period associated with capturing the first set of one or more images.

5. The method of claim 4, wherein a particular one of the second set of the plurality of images is less likely to be classified into the user search state when the average number of detected users over the predetermined time period is less.

6. The method of claim 1, wherein the user search parameter is based on a variation in the number of detected users over a predetermined time period associated with capturing the first set of one or more images.

7. The method of claim 6, wherein a particular one of the second set of the plurality of images is less likely to be classified into the user search state when the variation in the number of detected users over the predetermined time period is less.

8. The method of claim 1, wherein a particular one of the second set of the plurality of images is classified into the eye tracking state when there are one or more detected users in the first set of one or more images.

9. The method of claim 1, further comprising performing, for the particular one of the second set of the plurality of images classified into the eye tracking state, eye tracking upon multiple representations of multiple detected users.

10. The method of claim 1, wherein performing, for a particular one of the second set of the plurality of images classified into the eye tracking state, eye tracking upon a representation of a detected user is based on a spatial portion of the particular one of the second set of the plurality of images classified into the eye tracking state.

11. The method of claim 1, wherein searching, in a first one of the second set of the plurality of images classified into the user search state, for a representation of a user includes searching a first spatial portion of the first one of the second set of the plurality of images classified into the user search state.

12. The method of claim 11, wherein searching, in a second one of the second set of the plurality of images classified into the user search state, for a representation of a user includes searching a second spatial portion, different than the first spatial portion, of the second one of the second set of the plurality of images classified into the user search state.

13. The method of claim 1, wherein a resolution or an illumination of the capturing the second set of the plurality of images is based on the classifying.

14. An apparatus comprising:
an imaging system configured to capture a first set of one or more images and a second set of a plurality of images;
a processor configured to:
determine a value of a user search parameter based on one or more numbers of detected users in the first set of one or more images;
classify, based on the user search parameter, each of the second set of the plurality of images into one or more of a plurality of states comprising a user search state and an eye tracking state, wherein a first one of the second set of the plurality of images is classified into the eye tracking state without being classified into the user search state and a second one of the second set of the plurality of images is classified into the eye tracking state and is classified into the user search state;
perform, for each of the second set of the plurality of images classified into the eye tracking state, eye tracking upon a representation of a detected user; and
search, in each of the second set of the plurality of images classified into the user search state, for a representation of user.

15. The apparatus of claim 14, wherein the user search parameter is based on at least one of a number of currently detected users, an average number of detected users over a predetermined time period associated with capturing the first set of one or more images, or a variation in the number of detected users over the predetermined time period.

16. The apparatus of claim 14, wherein the processor is configured to search, in a first one of the second set of the plurality of images classified into the user search state, for a representation of a user by searching a first spatial portion of the first one of the second set of the plurality of images classified into the user search state.

17. The apparatus of claim 16, wherein the processor is configured to search, in a second one of the second set of the plurality of images classified into the user search state, for a representation of a user by searching a second spatial portion, different than the first spatial portion, of the second one of the second set of the plurality of images classified into the user search state.

18. The apparatus of claim 14, wherein a resolution of a camera of the imaging system or an illumination of a light source of the imaging system is based on the classifying.

19. A non-transitory computer-readable medium encoding instructions which, when executed, cause a processor to perform operations comprising:
capturing a first set of one or more images;
determining a value of a user search parameter based on one or more numbers of detected users in the first set of one or more images;
capturing a second set of a plurality of images;
classifying, based on the user search parameter, each of the second set of the plurality of images into one or more of a plurality of states comprising a user search state and an eye tracking state, wherein the user search state is associated with a first one or more numbers of detected users in the first set of the one or more images, wherein a first one of the second set of the plurality of images is classified into the eye tracking state without being classified into the user search state and a second one of the second set of the plurality of images is classified into the eye tracking state and is classified into the user search state;
performing, for each of the second set of the plurality of images classified into the eye tracking state, eye tracking upon a representation of a detected user; and
searching, in each of the second set of the plurality of images classified into the user search state, for a representation of user.

* * * * *